(12) United States Patent
Komyo et al.

(10) Patent No.: US 10,571,026 B2
(45) Date of Patent: Feb. 25, 2020

(54) SEALING STRUCTURE WITH TORSIONAL DAMPER AND OIL SEAL

(71) Applicant: NOK CORPORATION, Tokyo (JP)

(72) Inventors: Akihiro Komyo, Fukushima (JP); Hiroki Matsui, Fukushima (JP); Tomoki Nishide, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 239 days.

(21) Appl. No.: 15/630,039

(22) Filed: Jun. 22, 2017

(65) Prior Publication Data

US 2017/0284547 A1     Oct. 5, 2017

Related U.S. Application Data

(63) Continuation of application No. PCT/JP2015/085152, filed on Dec. 16, 2015.

(30) Foreign Application Priority Data

Jan. 7, 2015     (JP) ................. 2015-001592

(51) Int. Cl.
*F16J 15/32*     (2016.01)
*F16J 15/3232*   (2016.01)
(Continued)

(52) U.S. Cl.
CPC ......... *F16J 15/3232* (2013.01); *F16F 15/126* (2013.01); *F16H 55/36* (2013.01);
(Continued)

(58) Field of Classification Search
CPC ............ F16J 15/3244; F16J 15/153404–3432
See application file for complete search history.

(56) References Cited

U.S. PATENT DOCUMENTS 3,363,911 A *  1/1968  McKinven, Jr. ...... F16J 15/3232
                                                      277/349
4,293,136 A * 10/1981  George ............... F16F 15/1442
                                                      277/565

(Continued)

FOREIGN PATENT DOCUMENTS

EP    3 222 893 A1    9/2017
JP    S63-196867 U1  12/1988
(Continued)

OTHER PUBLICATIONS

Extended European Search Report dated Aug. 28, 2018 in the corresponding European Application No. 15877002.4.
(Continued)

*Primary Examiner* — Vishal A Patel
(74) *Attorney, Agent, or Firm* — Greenblum & Bernstein, P.L.C.

(57) ABSTRACT

A sealing structure with a torsional damper and an oil seal includes a damper pulley and an oil seal. The damper pulley includes, in a disk part of a hub on a front cover side, an annular projection that protrudes between the window and the boss part. The oil seal includes a side lip and a flange. The side lip extends to the inside of an annular groove of the damper pulley. The flange is opposed to the projection of the damper pulley to cover the projection so that a gap is formed between the flange and the projection.

20 Claims, 10 Drawing Sheets

(51) Int. Cl.
*F16F 15/126* (2006.01)
*F16J 15/447* (2006.01)
*F16J 15/3252* (2016.01)
*F16J 15/3204* (2016.01)
*F16H 55/36* (2006.01)

(52) U.S. Cl.
CPC ....... *F16J 15/3204* (2013.01); *F16J 15/3252* (2013.01); *F16J 15/447* (2013.01); *F16F 2230/24* (2013.01); *F16F 2230/30* (2013.01); *F16H 2055/366* (2013.01)

(56) References Cited

U.S. PATENT DOCUMENTS

| | | | |
|---|---|---|---|
| 8,573,601 B2* | 11/2013 | Nakagawa | F16J 15/3264 277/551 |
| 2002/0129675 A1 | 9/2002 | Watanabe et al. | |
| 2011/0006485 A1* | 1/2011 | Nakagawa | F16J 15/164 277/549 |
| 2011/0221140 A1* | 9/2011 | Nakagawa | F16J 15/164 277/412 |
| 2011/0272896 A1* | 11/2011 | Kamibayashiyama | F16J 15/3284 277/650 |
| 2017/0268676 A1 | 9/2017 | Kamiya et al. | |

FOREIGN PATENT DOCUMENTS

| | | |
|---|---|---|
| JP | H01-116237 U | 8/1989 |
| JP | H044563 U | 1/1992 |
| JP | H05-025049 U | 4/1993 |
| JP | H09-324861 A | 12/1997 |
| JP | 2002-295588 A | 10/2002 |
| JP | 2010-002009 A | 1/2010 |
| JP | 2010-014143 A | 1/2010 |
| JP | 2011-220389 A | 11/2011 |
| JP | 2011-241891 A | 12/2011 |
| JP | 2014-228019 A | 12/2014 |
| WO | 2013/077010 A1 | 5/2013 |

OTHER PUBLICATIONS

International Search Report and Written Opinion from Corresponding Application No. PCT/JP2015/085152; dated Jan. 19, 2016.
Chinese Office Action dated Jun. 27, 2018 for corresponding Chinese Application No. 201580072875.5 and English translation.
English translation of the Written Opinion from Corresponding Application No. PCT/JP2015/085152; dated Jan. 19, 2016.
English translation of the International Report on Patentability from Corresponding Application No. PCT/JP2015/085152; dated Jul. 11, 2017.
Japanese Office Action dated Aug. 5, 2019 for corresponding Japanese Application No. 2016-568308 and English translation.
Office Action dated Sep. 6, 2019 for corresponding European Application No. 15877002.4.

* cited by examiner

FIG.10 though holes passing through the disk part 101c of the hub# SEALING STRUCTURE WITH TORSIONAL DAMPER AND OIL SEAL

CROSS REFERENCE TO RELATED APPLICATIONS

This is a continuation application of International Patent Application No. PCT/JP2015/085152, filed on Dec. 16, 2015, which claims the benefit of Japanese Patent Application No. 2015-001592, filed on Jan. 7, 2015, the full contents of all of which are hereby incorporated by reference in their entirety.

BACKGROUND

Technical Field

The present disclosure relates to a sealing structure with a torsional damper and an oil seal, and particularly relates to a sealing structure comprising a torsional damper to absorb a torsional vibration generated from a rotary shaft of an engine of a vehicle or the like, and an oil seal for the torsional damper.

Background Art

In an engine of a vehicle, for example, a torsional damper is attached to one end of a crankshaft to reduce a torsional vibration caused by a rotational fluctuation of the crankshaft. The torsional damper used in the engine of the vehicle is typically in the form of a damper pulley and transmits part of the power of the engine to auxiliary machinery, such as a water pump, a compressor of an air conditioner or the like, through a power transmission belt. The gap between the torsional damper and, for example, a through-hole of a front cover into which the crankshaft is inserted is sealed by an oil seal.

Figure 10:
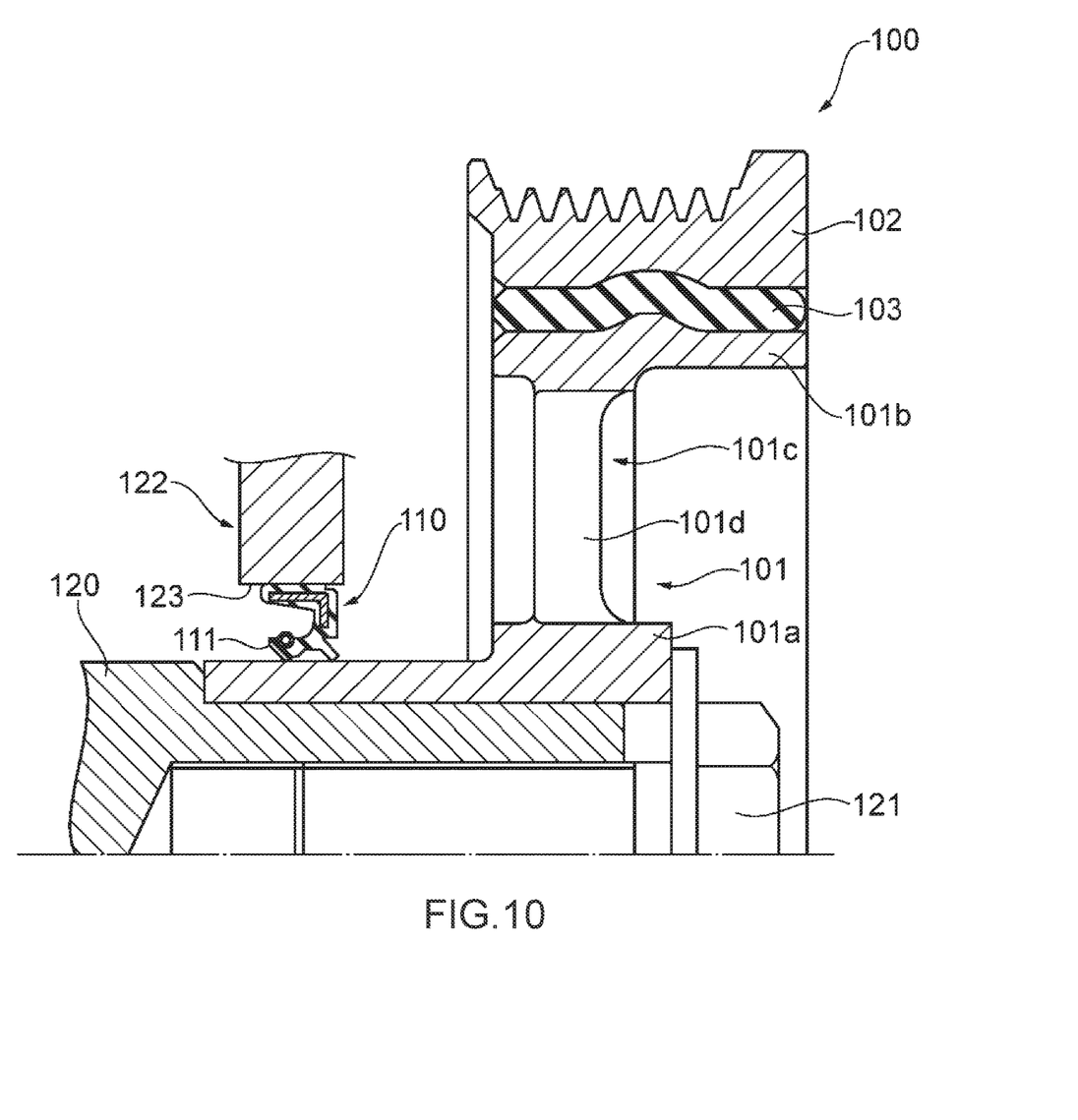
FIG. 10 is a partial cross-sectional view taken along an axis, schematically showing a conventional arrangement of a damper pulley and an oil seal used in an engine of a vehicle.

FIG. 10 is a partial cross-sectional view taken along an axis, schematically showing a conventional arrangement of a damper pulley and an oil seal of an engine of a vehicle. As shown in FIG. 10, a conventional damper pulley 100 includes a hub 101, a pulley 102, and a damper elastic body 103 disposed between the hub 101 and the pulley 102. The hub 101 includes a boss part 101a on the inner periphery side, a rim part 101b on the outer periphery side, and a disk part 101c connecting the boss part 101a and the rim part 101b to each other. The damper pulley 100 is fixed to a crankshaft 120 by a bolt 121 with the boss part 101a of the hub 101 fitted into one end part of the crankshaft 120.

The boss part 101a of the hub 101 of the damper pulley 100 attached to the crankshaft 120 is inserted into a through-hole 123 of a front cover 122 from outside of the engine, an oil seal 110 is press-fitted into the gap between the boss part 101a and the through-hole 123, and a seal lip 111 slidably abuts in a fluid-tight manner against the boss part 101a to seal between the damper pulley 100 and the front cover 122.

With such a conventional arrangement of the damper pulley 100 and the oil seal 110, foreign matter can enter between the oil seal 110 and the boss part 101a, and if the seal lip 111 catches the foreign matter, the seal lip 111 may be damaged or deteriorated, and the sealing performance of the oil seal 110 may deteriorate to lead to oil leakage. To avoid this, there is disclosed a structure that reduces entry of foreign matter to between the oil seal 110 and the boss part 101a through the gap between the damper pulley 100 and the front cover 122 (for example, see Japanese Patent Application Publication No. 09-324861).

In addition, to reduce the weight, some conventional damper pulleys 100 have a plurality of windows 101d as through holes passing through the disk part 101c of the hub 101, circumferentially formed (for example, see Japanese Utility Model Application Publication No. 05-25049 and Japanese Patent Application Publication No. 2011-241891).

However, the conventional damper pulley 100 with the windows 101d is susceptible to entry of foreign matter such as muddy water, sand or dust to the side of the engine through the windows 101d, although the damper pulley 100 has a reduced weight in the engine. Thus, such a torsional damper with windows requires further improvement in the capability of reducing entry of foreign matter to the seal part.

As described above, when the conventional damper pulley 100 with the windows 101d is used, there is a need for reducing exposure of the seal lip 111 of the oil seal 110 not only to foreign matter entering from around the outer periphery of the damper pulley 100 but also to foreign matter entering through the windows 101d. Furthermore, with the increasing diversity of the use environment of vehicles in recent years, there is a demand for further reducing exposure of the seal lip 111 of the oil seal 110 to foreign matter entering from the outside.

The present disclosure related to provide a sealing structure with a torsional damper and an oil seal that can reduce exposure of a seal lip of the oil seal to foreign matter entering from around the torsional damper.

SUMMARY

A sealing structure with a torsional damper and an oil seal according to the present disclosure is a sealing structure with a torsional damper and an oil seal, wherein the torsional damper includes a hub, an annular mass body centered about an axis that covers an outer circumference of the hub, and a damper elastic body that is disposed between the hub and the mass body and elastically connects the hub and the mass body to each other, and the oil seal includes an annular seal lip centered about the axis, an annular side lip centered about the axis, and an annular flange centered about the axis. The torsional damper is attached to one end of a rotary shaft with the hub being inserted into a through-hole of an attachment target part, the oil seal is attached in the through-hole of the attachment target part to seal between the hub and the through-hole of the attachment target part. The hub includes an annular boss part centered about the axis, an annular rim part centered about the axis that is located at an outer periphery of the boss part, and a disk-shaped disk part centered about the axis that connects the boss part and the rim part to each other. The disk part is provided with an annular projection that protrudes on the attachment target part side, and the seal lip of the oil seal abuts against the boss part in a slidable manner, the side lip of the oil seal extends to the inside of an annular groove formed between the projection and the boss part in the disk part, and the flange of the oil seal covers the projection so that a gap is formed between the flange and the projection.

In the sealing structure with a torsional damper and an oil seal according to an aspect of the present disclosure, water and oil repellent agent is applied on an outer periphery side part of the flange.

In the sealing structure with a torsional damper and an oil seal according to an aspect of the present disclosure, the projection includes a discharge part. The discharge part has a plurality of grooves that extend toward the outer periphery side and form a flow of a fluid toward the outer periphery side along with the rotation about the axis.

In the sealing structure with a torsional damper and an oil seal according to an aspect of the present disclosure, the flange, at the outer periphery side part, includes an annular protrusion that protrudes toward the outer periphery side, and the protrusion abuts against the attachment target part.

In the sealing structure with a torsional damper and an oil seal according to an aspect of the present disclosure, the disk part includes a window that passes through the disk part, and the projection protrudes from between the window and the boss part.

The sealing structures with a torsional damper and an oil seal according to the present disclosure can reduce exposure of a seal lip of the oil seal to foreign matter entering from around the torsional damper.

DESCRIPTION OF EMBODIMENTS

Hereinafter, embodiments of the present disclosure will be described with reference to the drawings.

Figure 1:
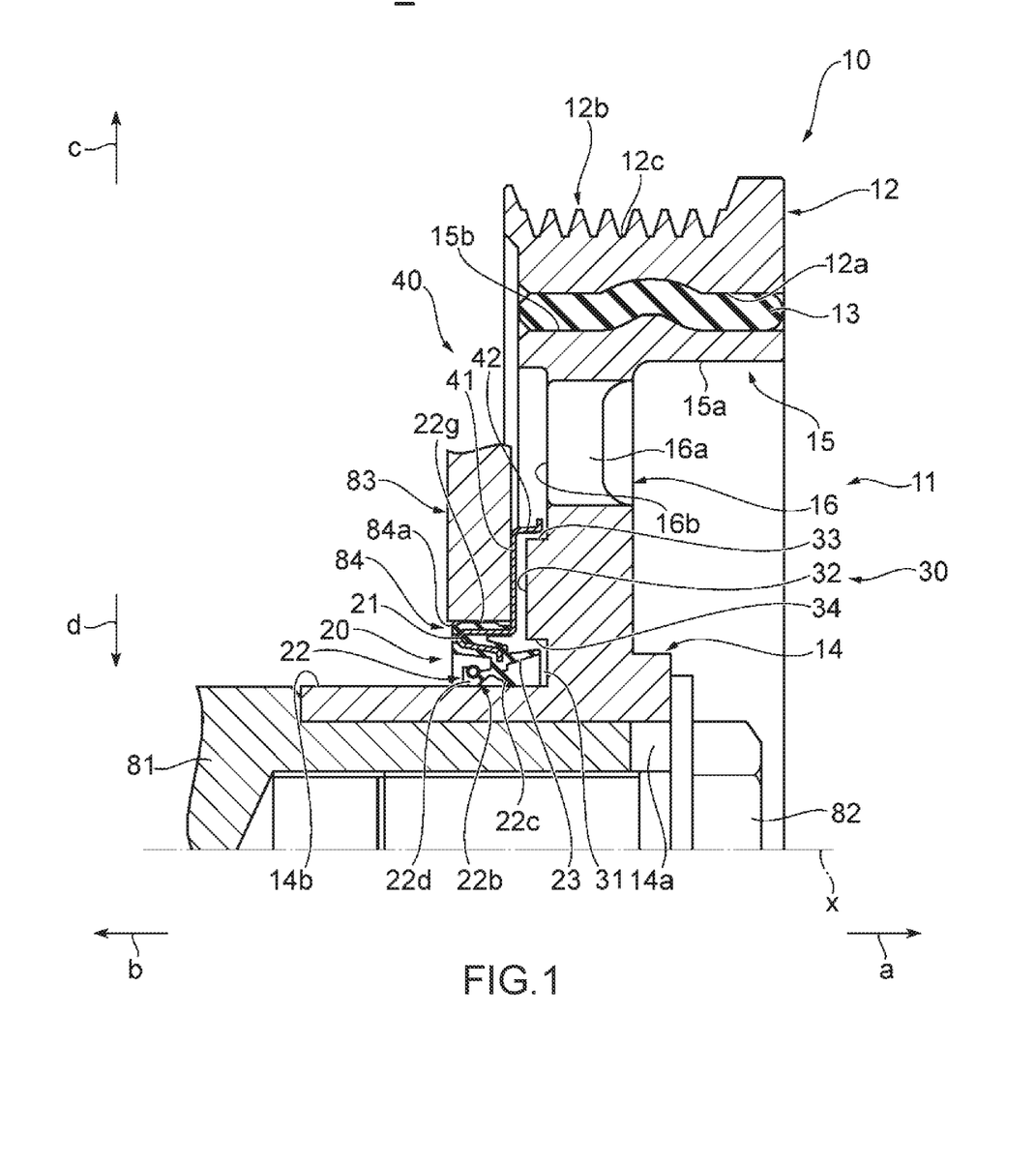
FIG. 1 is a partial cross-sectional view taken along an axis, showing a schematic configuration of a sealing structure with a torsional damper and an oil seal according to an embodiment of the present disclosure.

FIG. 1 is a partial cross-sectional view taken along an axis, showing a schematic configuration of a sealing structure with a torsional damper and an oil seal according to an embodiment of the present disclosure. The sealing structure with a torsional damper and an oil seal according to the embodiment of the present disclosure is used for an engine of an automobile. In the following, for convenience of explanation, an arrow a (see FIG. 1) direction in a direction of an axis x will be referred to as an outer side, and an arrow b (see FIG. 1) direction in the direction of the axis x will be referred to as an inner side. More specifically, the outer side is the direction away from the engine, and the inner side is the direction toward the engine and is the engine side. In a direction perpendicular to the axis x (which will be also referred to as "a radial direction"), the direction away from the axis x (indicated by an arrow c in FIG. 1) will be referred to as an outer periphery side, and the direction toward the axis x (indicated by an arrow "d" in FIG. 1) will be referred to as an inner periphery side.

As shown in FIG. 1, a sealing structure 1 with a torsional damper and an oil seal according to the embodiment of the present disclosure includes a damper pulley 10 as the torsional damper, and an oil seal 20, and is formed of the damper pulley 10 and the oil seal 20. The damper pulley 10 is fixed to one end of a crankshaft 81 of the engine by a bolt 82, and the oil seal 20 forms a seal between a through-hole 84 of a front cover 83 of the engine and the damper pulley 10.

The damper pulley 10 includes a hub 11, a pulley 12 as a mass body, and a damper elastic body 13 disposed between the hub 11 and the pulley 12. The hub 11 is an annular member centered about the axis x and includes a boss part 14 on the inner periphery side, a rim part 15 on the outer periphery side, and a disk part 16 having a substantially circular disk-like shape that connects the boss part 14 and the rim part 15 to each other. The hub 11 is molded or otherwise formed from a metal material, for example.

In the hub 11, the boss part 14 is an annular part that has a through-hole 14a and is centered about the axis x, and the disk part 16 extends in the outer periphery direction from an outer circumferential surface of an outer side part of the boss part 14. The boss part 14 has an outer circumferential surface 14b, which is a cylindrical outer periphery side surface of an inner side part thereof, and the outer circumferential surface 14b is a smooth surface and serves as a sealing surface for the oil seal 20 as described later. The rim part 15 is an annular, or more specifically, cylindrical part centered about the axis x, and the rim part 15 is a part located further on the outer periphery side than the boss part 14, concentrically with the boss part 14. The disk part 16 extends in the inner periphery direction from an inner circumferential surface 15a, which is an surface of the rim part 15 on the inner periphery side. The damper elastic body 13 is in pressure-contact with an outer circumferential surface 15b, which is a surface of the rim part 15 on the outer periphery side.

Figure 2:
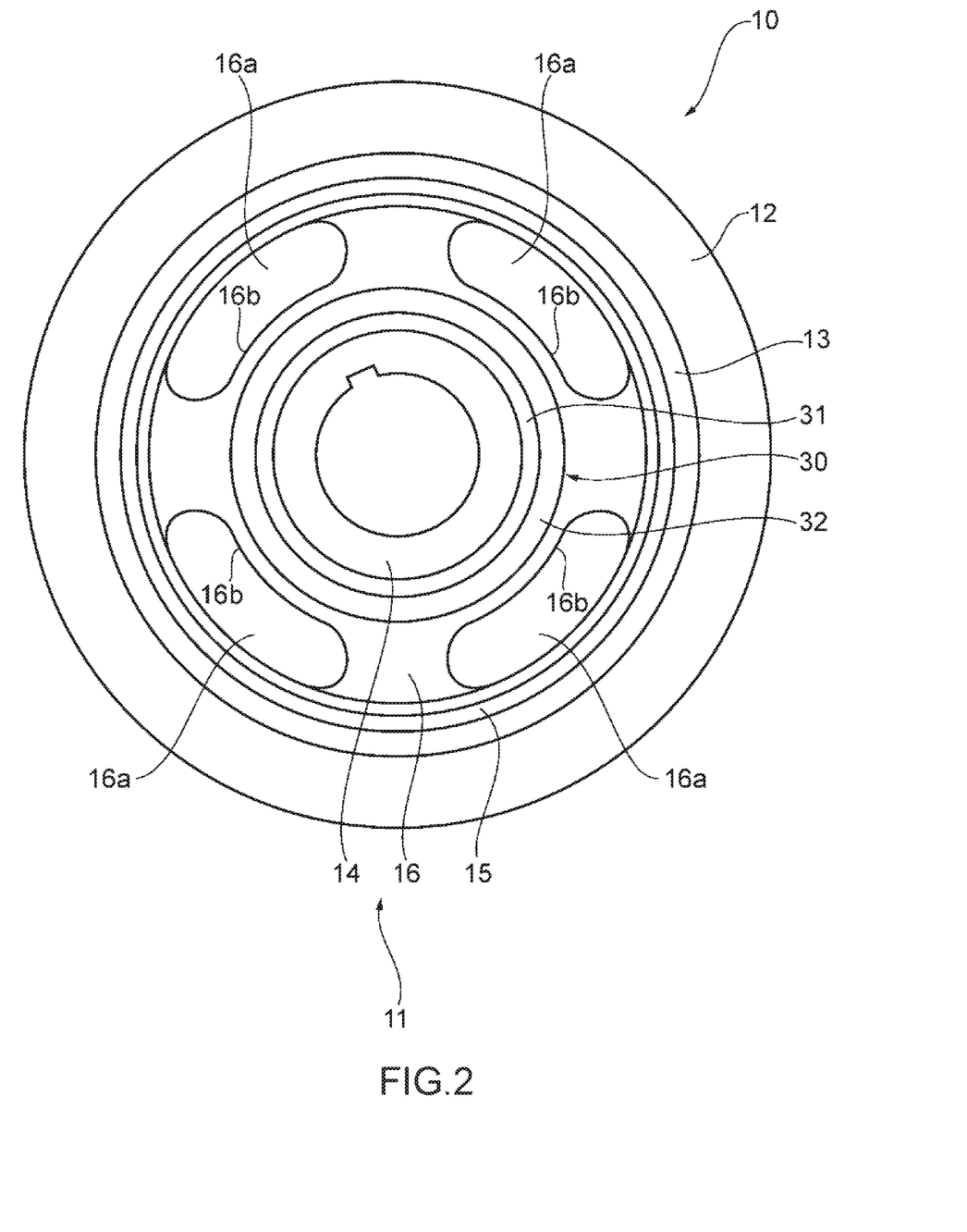
FIG. 2 is a rear view showing a schematic configuration of the torsional damper of the sealing structure shown in FIG. 1.

The disk part 16 extends between the boss part 14 and the rim part 15 and connects the boss part 14 and the rim part 15 to each other. The disk part 16 may extends in a direction perpendicular to the axis x or in a direction oblique to the axis x. The cross section of the disk part 16 taken along the axis x (also referred to simply as a "cross section") may be curved or straight. As shown in FIGS. 1 and 2, the disk part 16 has at least one window 16a, which is a through-hole penetrating the disk part 16 between the inner side and the outer side. According to this embodiment, four windows 16a are formed concentrically about the axis x and at regular angular intervals (see FIG. 2). The windows 16a are intended to reduce the weight of the hub 11 and thus the damper pulley 10.

The pulley 12 is an annular member centered about the axis x and is shaped to cover the hub 11 on the outer periphery side. More specifically, an inner circumferential surface 12a, which is a surface of the pulley 12 on the inner periphery side, has a shape that conforms to the shape of the outer circumferential surface 15b of the rim part 15 of the hub 11, and as shown in FIG. 1, the pulley 12 is positioned in such a manner that the inner circumferential surface 12a is radially opposed at a distance to the outer circumferential surface 15b of the rim part 15. In the outer circumferential surface 12b, which is a surface of the pulley 12 on the outer periphery side, a plurality of annular V-shaped grooves 12c are formed so that a timing belt (not shown) can be wound around the pulley 12.

The damper elastic body 13 is disposed between the pulley 12 and the rim part 15 of the hub 11. The damper elastic body 13 is a damper rubber member and is molded by cross-linking (vulcanization) of a rubber-like elastic material having high heat resistance, high cold resistance and high fatigue strength. The damper elastic body 13 is press-fitted between the pulley 12 and the rim part 15 of the hub 11, and fitted and fastened between the inner circumferential surface 12a of the pulley 12 and the outer circumferential surface 15b of the rim part 15.

In the damper pulley 10, the pulley 12 and the damper elastic body 13 form a damper section, and the natural frequency in the torsional direction of the damper section is tuned to agree with the natural frequency in the torsional direction of the crankshaft 81, which lies within a predetermined frequency range in which the torsional angle of the crankshaft 81 is at the maximum. That is, the inertial mass of the pulley 12 in the peripheral direction and the shear spring constant of the damper elastic body 13 in the torsional direction are adjusted so that the natural frequency in the torsional direction of the damper section agrees with the natural frequency in the torsional direction of the crankshaft 81.

The damper pulley 10 includes a projection 30 that is an annular projected part protruding between the window 16a and the boss part 14 on the side of the front cover 83 which is an attachment target part, in the disk part 16 of the hub 11. Specifically, the projection 30 is provided on the inner periphery side than the window 16a and on the outer periphery side than the boss part 14 in the inner side surface 16b that is an inner side surface of the disk part 16, and the projection 30 protrudes in the inner side direction. The projection 30 surrounds the outer peripheral surface 14b of the boss part 14 from the outer periphery side at a distance from the outer peripheral surface 14b, and an annular groove 31 that is recessed in the outer side direction is formed between the projection 30 and the outer peripheral surface 14b. Note that the projection 30 is formed integrally with the disk part 16, that is, the projection 30 and the hub 11 are integrally made from the same material.

In the present embodiment, as shown in FIG. 1, the projection 30 has a rectangular cross section and is defined by an inner side surface 32 that is a surface faces the inner side, an outer peripheral surface 33 that is a surface on the outer periphery side, and an inner peripheral surface 34 that is a surface on the inner periphery side. The groove 31 is defined by the inner peripheral surface 34 of the projection 30, a part of the outer peripheral surface 14b of the boss part 14 opposed to the inner peripheral surface 34, and the inner side surface 16b of the disk part 16.

As described above, the damper pulley 10 is attached to one end of the crankshaft 81. More specifically, as shown in FIG. 1, the damper pulley 10 is fixed to the crankshaft 81 by inserting one end of the crankshaft 81 into the through-hole 14a of the boss part 14 of the hub 11 and screwing the bolt 82 into the crankshaft 81 from the outer side. A key to be engaged with the crankshaft 81 and the boss part 14, such as a Woodruff key, is provided between the crankshaft 81 and the boss part 14 to prevent the damper pulley 10 from rotating relative to the crankshaft 81.

When attached to the crankshaft 81, the damper pulley 10 is in a state where the inner part of the boss part 14 having the outer peripheral surface 14b is inserted in the through-hole 84 of the front cover 83, and there is an annular gap between the outer peripheral surface 14b of the boss part 14 and the through-hole 84 of the front cover 83.

Figure 3:
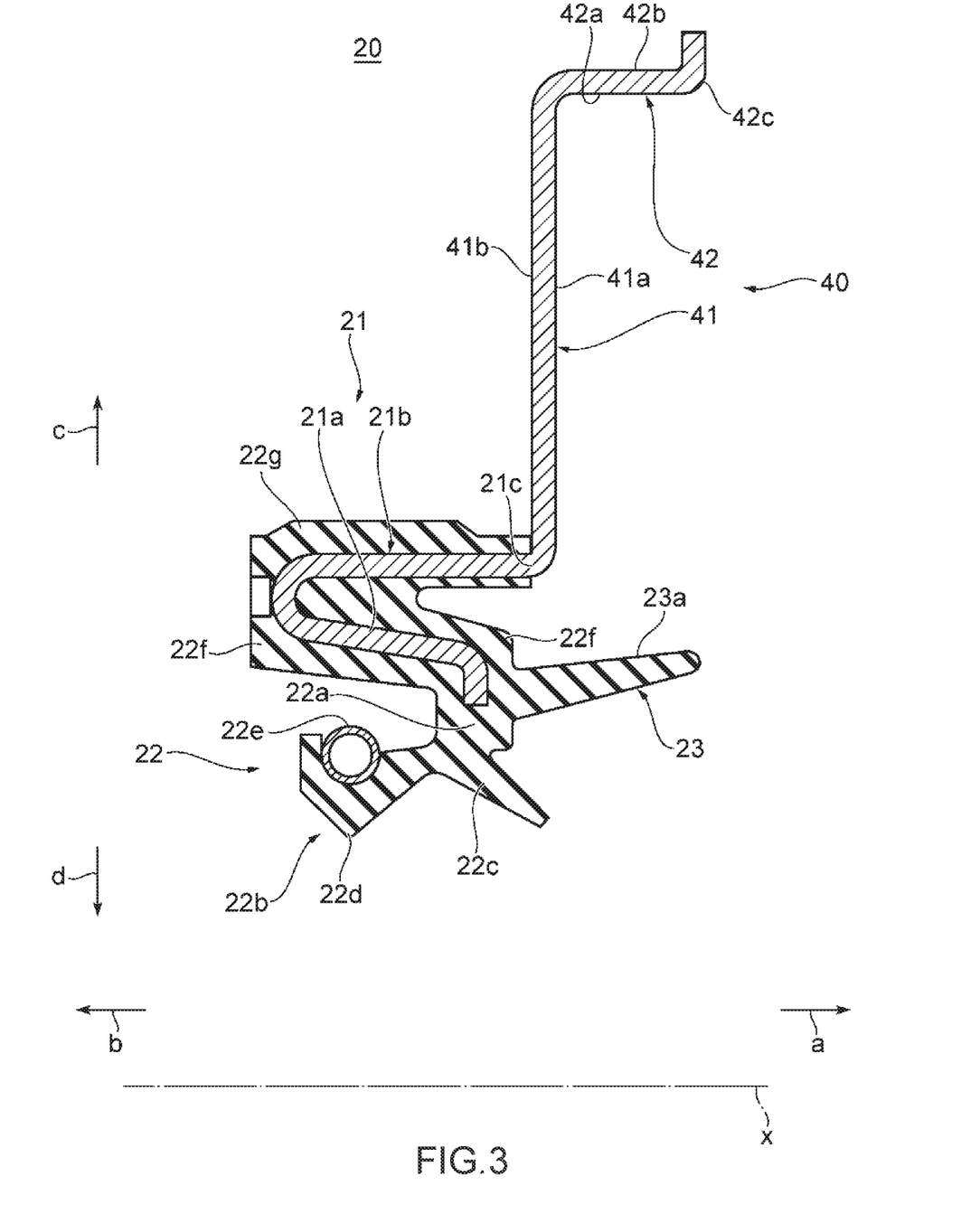
FIG. 3 is a partial cross-sectional view showing a schematic configuration of the oil seal of the sealing structure shown in FIG. 1.

As shown in FIGS. 1 and 3, the oil seal 20 includes a reinforcing ring 21 that is made of a metal and has an annular shape centered about the axis x and an elastic body part 22 that is made of an elastic material and has an annular shape centered about the axis x. The elastic body part 22 is integrally attached to the reinforcing ring 21. The metal forming the reinforcing ring 21 may be stainless steel or SPCC (cold rolled steel sheet), for example. The elastic material forming the elastic body part 22 may be various rubber materials, for example. The various rubber materials include synthetic rubbers, such as nitrile rubber (NBR), hydrogenated nitrile rubber (H-NBR), acrylic rubber (ACM) or fluororubber (FKM).

The reinforcing ring 21 includes an inner peripheral part 21a and a cylindrical part 21b (see FIG. 3). The inner peripheral part 21a is an annular part centered about the axis x, and has a substantially S-shaped cross section, for example. The cylindrical part 21b is a cylindrical part that extends outwardly in the direction of the axis x from an outer periphery side end of the inner peripheral part 21a.

The elastic body part 22 is attached to the reinforcing ring 21. In this embodiment, the elastic body part 22 is formed integrally with the reinforcing ring 21 to cover the reinforcing ring 21. The elastic body part 22 includes a lip waist part 22a, a seal lip 22b, and a dust lip 22c. As shown in FIG. 3, the lip waist part 22a is a part located in the vicinity of an inner periphery side end of an inner peripheral part 21a of the reinforcing ring 21, and the seal lip 22b is a part that extends toward the inner side from the lip waist part 22a and is placed to be opposed to the inner peripheral part 21a of the reinforcing ring 21. The dust lip 22c extends from the lip waist part 22a in the direction of the axis x.

The seal lip 22b has, at the inner side end, an annular lip tip end part 22d having a cross section whose shape is wedge shape protruding in the inner periphery side direction. The lip tip end part 22d is shaped to come into close contact in a manner that the outer peripheral surface 14b of the boss part 14 of the hub 11 is slidable, and to form a seal between the lip tip end part 22d and the damper pulley 10, as described later. On the outer peripheral part side of the seal lip 22b, a garter spring 22e is fitted, and the garter spring 22e radially inwardly biases (press) the seal lip 22b.

The dust lip 22c is a part that extends from the lip waist part 22a toward the outer side and the inner periphery side. The dust lip 22c prevents entry of foreign matter toward the lip tip end part 22d during use.

The elastic body part 22 includes a side cover 22f and an outer peripheral cover 22g. The side cover 22f covers the inner peripheral part 21a of the reinforcing ring 21, and the outer peripheral cover 22g covers the cylindrical part 21b of the reinforcing ring 21 from the outer periphery side.

The oil seal 20 includes a side lip 23 that extends toward the outer side. The side lip 23, as shown in FIGS. 1 and 3, extends in a direction oblique to the axis x direction in cross section and in a direction away from the axis x toward the outer side (the damper pulley 10 side) in cross section. That is, the side lip 23 increases in diameter from the inner side (the lip waist part 22a) toward the outer side in the direction of the axis x, and has a conical tubular and annular shape. Thus, an outer peripheral surface 23a which is a surface of the side lip 23 on the outer periphery side forms a tapered surface whose diameter increases toward the outer side from the inner side in the direction of the axis x. Note that the side lip 23 may extend in parallel with the axis x.

The oil seal 20 includes a flange 40. As shown in FIGS. 1, 3, the flange 40 is an annular member centered about the axis x, and covers the projection 30 of the damper pulley 10 so that a gap is formed between the flange 40 and the projection 30 as described later. As shown in FIG. 3, the flange 40 extends from an outer end 21c which is an outer side end of the cylindrical part 21b of the reinforcing ring 21, and the reinforcing ring 20 and the flange 40 are formed as an integrated member. The flange 40 and the reinforcing ring 20 are integrally made from the same material.

In the present embodiment, as shown in FIG. 3, the flange 40 has a substantially L-shaped cross section, and includes a flange disk part 41 and a flange cylindrical part 42. The flange disk part 41 is a hollow disk-shaped part centered about the axis x that extends in the outer periphery direction from the outer end 21c of the cylindrical part 21b of the reinforcing ring 21. The flange cylindrical part 42 is a cylindrical part centered about the axis x that extends outwardly in the direction of the axis x from an outer periphery side end of the flange disk part 41. Thus, an outer side surface 41a that is a surface of the flange disk part 41 facing the outer side is a disk surface that extends in a radial direction. An inner peripheral surface 42a which is a surface of the flange cylindrical part 42 on the inner periphery side and an outer peripheral surface 42b which is a surface of the flange cylindrical part 42 on the outer periphery side are cylindrical surfaces centered about the axis x. The flange cylindrical part 42 is bent toward the outer periphery side in an outer periphery side end (an outer periphery end 42c).

The reinforcing ring 21 and the flange 40 are made from the same material and integrally manufactured by press working or forging, for example, and the elastic body part 22 is molded with a mold by cross-linking (vulcanization). In the cross-linking, the reinforcing ring 21 and the flange 40 are placed inside the mold, and the elastic body part 22 is bonded to the reinforcing ring 21 by cross-linking (vulcanization) bonding, and then the elastic body part 22 is integrally molded with the flange 40 and the reinforcing ring 21.

As described above, the oil seal 20 seals the gap formed between the through-hole 84 of the front cover 83 and the outer peripheral surface 14b of the boss part 14 of the damper pulley 10. More specifically, as shown in FIG. 1, the oil seal 20 is press-fitted into the through-hole 84 of the front cover 83, and an outer peripheral cover 22g of the elastic body part 22 is compressed and abuts in a fluid tight manner against an inner peripheral surface 84a which is the inner periphery side surface of the through-hole 84. Thus, a seal is formed between the oil seal 20 and the through-hole 84 of the front cover 83. On the other hand, the lip tip end part 22d of the seal lip 22b abuts in a fluid tight manner against the outer peripheral surface 14b of the boss part 14 of the hub 11, and thus, a seal is formed between the oil seal 20 and the damper pulley 10. In the state in which the oil seal 20 is attached to the front cover 83, a surface (an inner side surface 41b) of the flange disk part 41 of the flange 40 facing the inner side abuts against the front cover 83.

Figure 4:
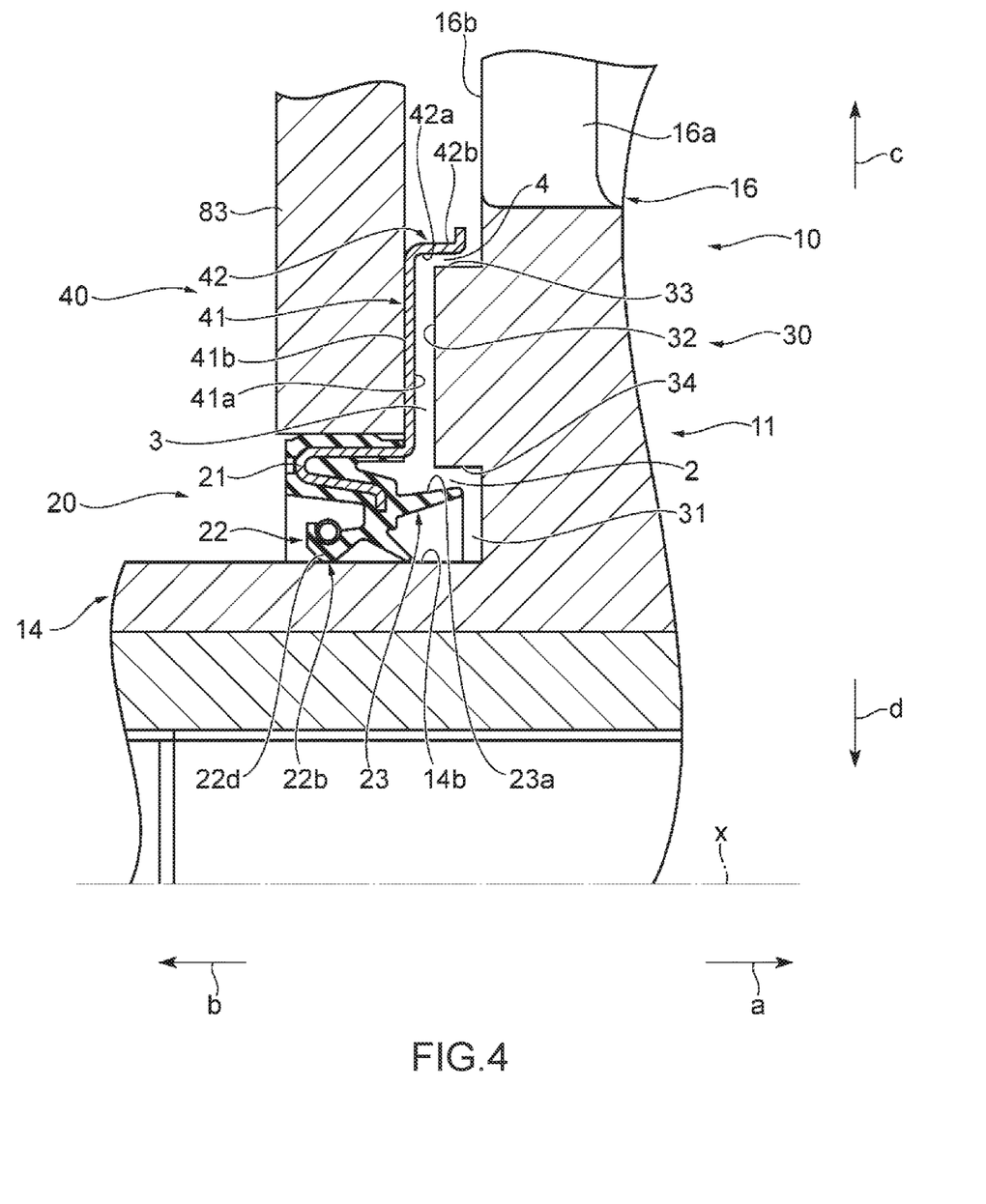
FIG. 4 is a partial enlarged cross-sectional view of the sealing structure with a torsional damper and an oil seal shown in FIG. 1.

Next, in the sealing structure 1 with a torsional damper and an oil seal, the projection 30 and the groove 31 of the damper pulley 10, and the side lip 23 and the flange 40 of the oil seal 20 will be described in detail with reference to FIG. 4. FIG. 4 is a partial enlarged cross-sectional view of the sealing structure 1 with a torsional damper and an oil seal.

As shown in FIG. 4, the side lip 23 of the oil seal 20 extends to the inside of the annular groove 31 of the damper pulley 10. More specifically, the side lip 23 extends toward the inner peripheral surface 34 of the projection 30, and the outer peripheral surface 23a of the side lip 23 is opposed to the inner peripheral surface 34 of the projection 30 so that an annular gap 2 is formed between the outer peripheral surface 23a of the side lip 23 and the inner peripheral surface 34 of the projection 30. Note that the side lip 23 does not abut against the projection 30. The side lip 23 is not limited to one extending in the direction oblique toward the inner peripheral surface 34 of the projection 30 as described above, and may extend in parallel with the axis x.

As shown in FIG. 4, the flange 40 of the oil seal 20 is opposed to the projection 30 of the damper pulley 10 to cover the projection 30, and covers the projection 30 with facing the projection 30 from the inner side and the outer periphery side. More specifically, the flange disk part 41 of the flange 40 is opposed at a distance to the inner side surface 32 of the projection 30 in the direction of the axis x so that an annular gap 3 is formed between the outer side surface 41a of the flange disk part 41 and the inner side surface 32 of the projection 30. The flange cylindrical part 42 of the flange 40 is radically opposed at a distance to the outer peripheral surface 33 of the projection 30 so that an annular gap 4 is formed between the inner peripheral surface 42a of the flange cylindrical part 42 and the outer peripheral surface 33 of the projection 30.

The annular gap 2 is formed between the side lip 23 of the oil seal 20 and the projection 30 of the damper pulley 10, and the annular gap 2 provides a labyrinth seal. Therefore, even if foreign matter such as muddy water, sand, or dust enters from the outside not only through a gap between the pulley 12 and the front cover 83 but also through windows 16a of the disk part 16 of the hub 11, the labyrinth seal (the gap 2) formed by the side lip 23 and the projection 30 reduces further entry of the entered foreign matter further into the seal lip 22b side. In this way, exposure of the seal lip 22b of the oil seal 20 to foreign matter entering from the damper pulley 10 side can be reduced. Thus, damage to or deterioration of the lip tip end part 22d due to the lip tip end part 22d catching foreign matter can be reduced, and thus deterioration of the sealing performance of the oil seal 20 that leads to oil leakage can be reduced.

The annular gap 3 and the annular gap 4 are formed between the flange 40 of the oil seal 20 and the projection 30 of the damper pulley 10, and the annular gap 3 and annular gap 4 provide a labyrinth seal. Therefore, even if foreign matter enters from the outside not only through a gap between the pulley 12 and the front cover 83 but also through window 16a, the labyrinth seal (the gaps 3, 4) formed by the flange 40 and the projection 30 reduces further entry of the entered foreign matter into the seal lip 22b side in the outer periphery of the gap 2. In this way, exposure of the seal lip 22b of the oil seal 20 to foreign matter entering from the damper pulley 10 side can be further reduced. Thus, damage to or deterioration of the lip tip end part 22d due to the lip tip end part 22d catching foreign matter can be further reduced, and thus deterioration of the sealing performance of the oil seal 20 that leads to oil leakage can be further reduced.

Since the flange 40 includes the flange cylindrical part 42 that extends toward the direction of the axis x in the inner periphery side than the window 16a, foreign matter entering from the damper pulley side can be accumulated on the outer peripheral surface 42b of the flange cylindrical part 42. The accumulated foreign matter can be discharged to the outside by the force of gravity or the centrifugal force, or by air flow when the damper pulley 10 is rotated. The flange cylindrical part 42 can also achieve the effect of reducing further entry of the entered foreign matter into the seal lip 22b side.

Thus, the sealing structure 1 with a torsional damper and an oil seal according to the embodiment of the present disclosure includes double labyrinth seals of the labyrinth seal on the outer periphery side (the gaps 3, 4) and the labyrinth seal (the gap 2), and the flange cylindrical part 42 of the flange 40 on which foreign matter is accumulated, thereby further improving a function of reducing further entry of foreign material entered from the damper pulley side into the seal lip 22b side.

The side lip 23 and the projection 30 are not in contact with each other, the flange 40 and the projection 30 are not in contact with each other, thereby improving the sealing performance without increasing a sliding torque (resistance) of the damper pulley 10.

As described above, the sealing structure 1 with a torsional damper and an oil seal according to the embodiment of the present disclosure can reduce exposure of the seal lip 22b of the oil seal 20 to foreign matter that enters from around the damper pulley 10 side.

Next, the variation of the sealing structure 1 with a torsional damper and an oil seal according to this embodiment of the present disclosure described above will be described.

Figure 5:
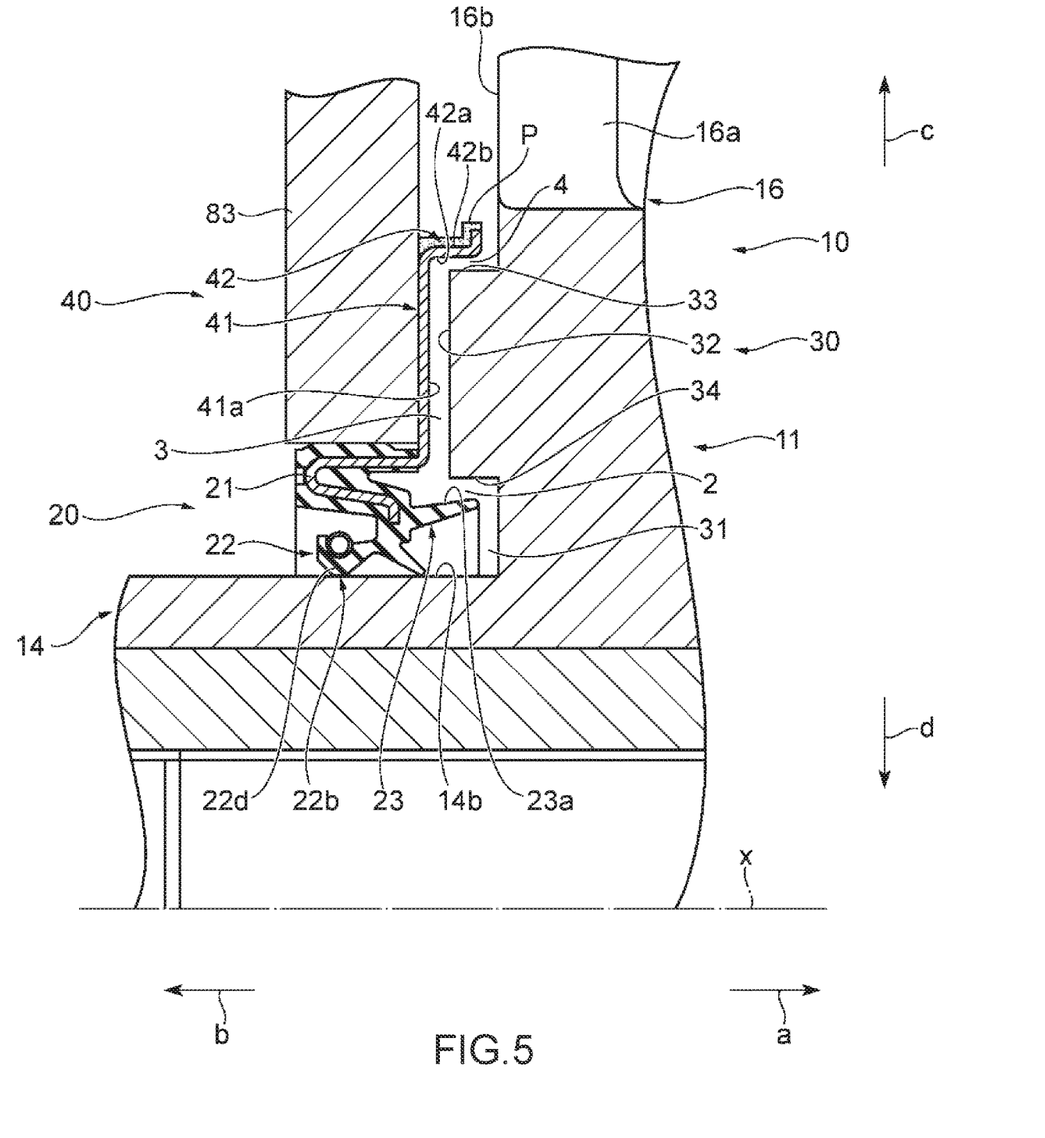
FIG. 5 is a partial enlarged cross-sectional view showing a schematic configuration of a first variation of the sealing structure with a torsional damper and an oil seal shown in FIG. 1.

FIG. 5 is a partial enlarged cross-sectional view showing a schematic configuration of a first variation of the sealing structure 1 with a torsional damper and an oil seal according to the embodiment of the present disclosure. The first variation differs in that, in the sealing structure 1 with a torsional damper and an oil seal described above, water and oil repellent agent is applied on the flange part 40. In the following, the difference will be described, and the components that are the same as or similar to those of the sealing structure 1 with a torsional damper and an oil seal described above will be denoted by the same reference numerals and will not be further described.

As shown in FIG. 5, in the first variation of the sealing structure 1 with a torsional damper and an oil seal, the water and oil repellent agent p having a water repellency and an oil repellency is applied to the outer peripheral surface 42b of the flange cylindrical part 42 of the flange part 40.

Since the water and oil repellent agent p is applied to the outer peripheral surface 42b of the flange cylindrical part 42, foreign matter accumulated on the outer peripheral surface 42b of the flange cylindrical part 42 is easily discharged to the outside or downwardly along the outer peripheral surface 42b. Therefore, foreign matter can be prevented from entering into the seal lip 22b side, and the flange 40 can be prevented from being corroded by muddy water or the like.

Thus, the first variation of the sealing structure 1 with a torsional damper and an oil seal can achieve the effects of the water and oil repellent agent p in addition to the effects of the sealing structure 1 with a torsional damper and an oil seal according to the first embodiment of the present disclosure.

Figure 6:
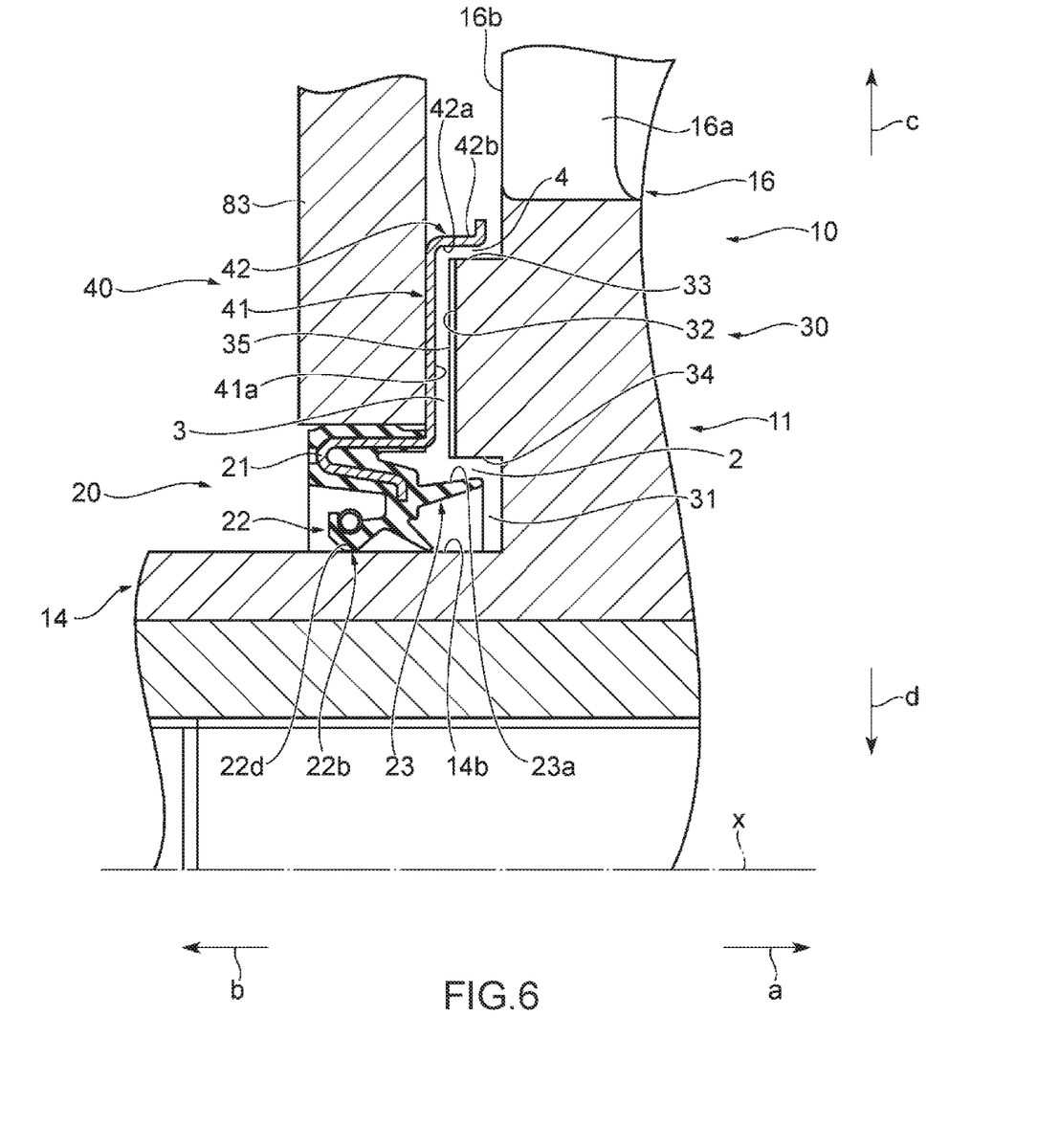
FIG. 6 is a partial enlarged cross-sectional view showing a schematic configuration of a second variation of the sealing structure with a torsional damper and an oil seal shown in FIG. 1.
Figure 7:
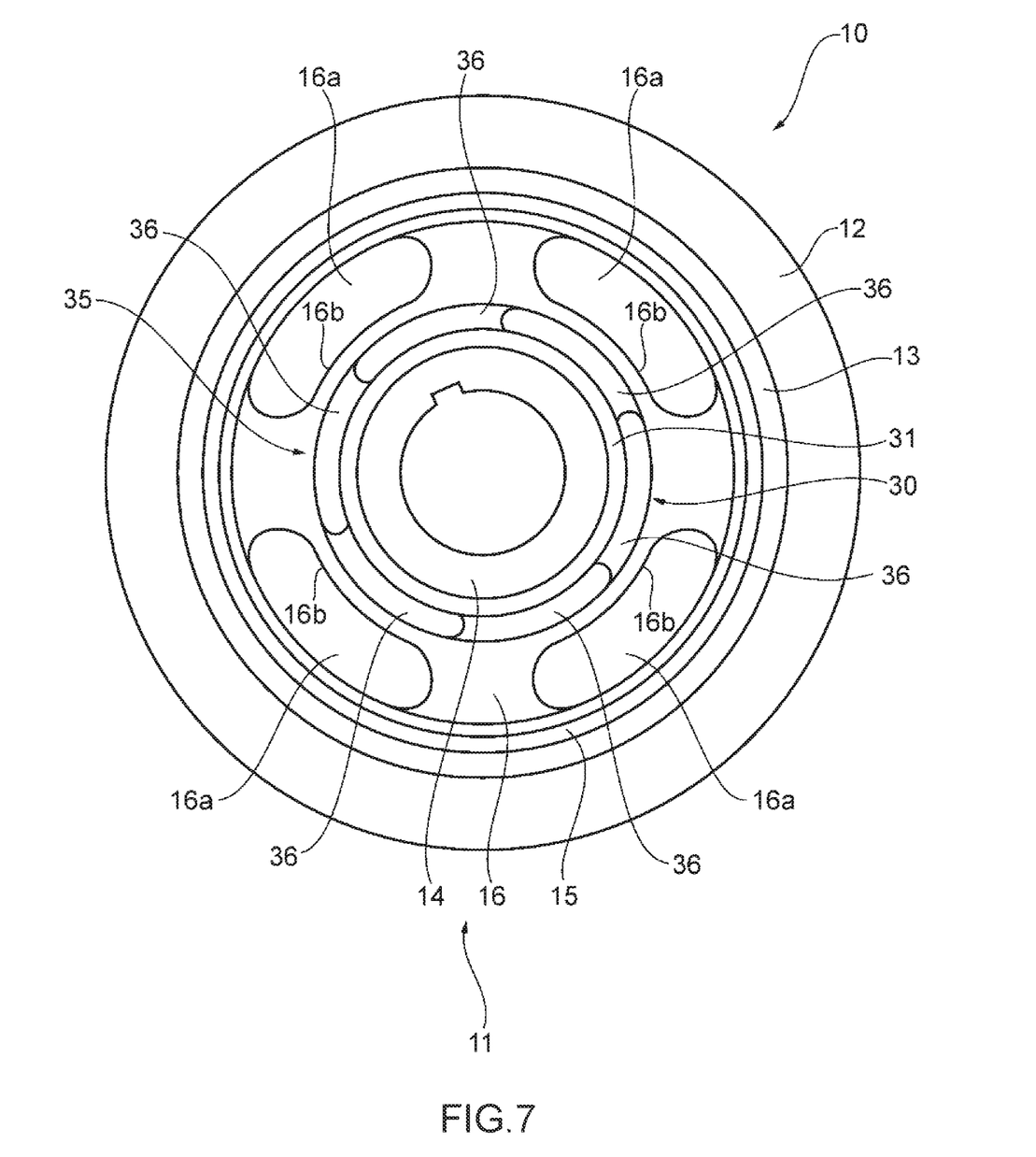
FIG. 7 is a rear view showing a schematic configuration of a torsional damper in the second variation of the sealing structure with a torsional damper and an oil seal shown in FIG. 6.

Next, a second variation of the sealing structure 1 with a torsional damper and an oil seal according to the embodiment of the present disclosure described above will be described. FIG. 6 is a partial enlarged cross-sectional view showing a schematic configuration of the second variation of the sealing structure 1 with a torsional damper and an oil seal according to the embodiment of the present disclosure. FIG. 7 is a rear view showing a schematic configuration of a torsional damper in the second variation of the sealing structure 1 with a torsional damper and an oil seal according to the embodiment of the present disclosure. The second variation differs in that, in the sealing structure 1 with a torsional damper and an oil seal described above, a plurality of grooves having a pump operation are provided to the projection 30 of the damper pulley 10. In the following, the difference will be described, and the components that are the same as or similar to those of the sealing structure 1 with a torsional damper and an oil seal described above will be denoted by the same reference numerals and will not be further described.

As shown in FIGS. 6, 7, the projection 30 of the damper pulley 10 includes a pump operation part 35 capable of performing the pump operation in the inner side surface 32. As shown in FIG. 7, the pump operation part 35 has a plurality of grooves 36 that are formed in the inner side surface 32 and extend toward the outer periphery side. The plurality of grooves 36 are formed with arranged in the peripheral direction with the axis x as the center. The groove 36 is formed in a shape to cause a flow of a fluid toward the outer periphery side from the inner periphery side when the damper pulley 10 is rotated. The groove 36 may be defined by the projection protruding from the inner side surface 32, and may be formed by forming the recess in the inner side surface 32.

When the damper pulley 10 is rotated, the damper pulley 10 forms the flow of the fluid toward the outer periphery side from the inner periphery side by the pump operation part 35 in the inner side surface 32 of the projection 30, to perform the pump operation. Thus, even if foreign matter enters through the gaps 3, 4 between the flange 40 and the projection 30, the foreign matter can be discharged in the outer periphery direction and can be discharged to the outside from the gaps 3, 4 by the pump operation of the pump operation part 35. Furthermore, it is possible to make it difficult for foreign matter to enter into the gaps 3, 4 by the flow of the fluid toward the outer periphery side from the inner periphery side. Thereby, it is possible to make it difficult for foreign matter to enter into the seal lip 22b side.

Thus, the second variation of the sealing structure 1 with a torsional damper and an oil seal can achieve the effects of the pump operation part 35 in addition to the effects of the sealing structure 1 with a torsional damper and an oil seal according to the first embodiment of the present disclosure.

Figure 8:
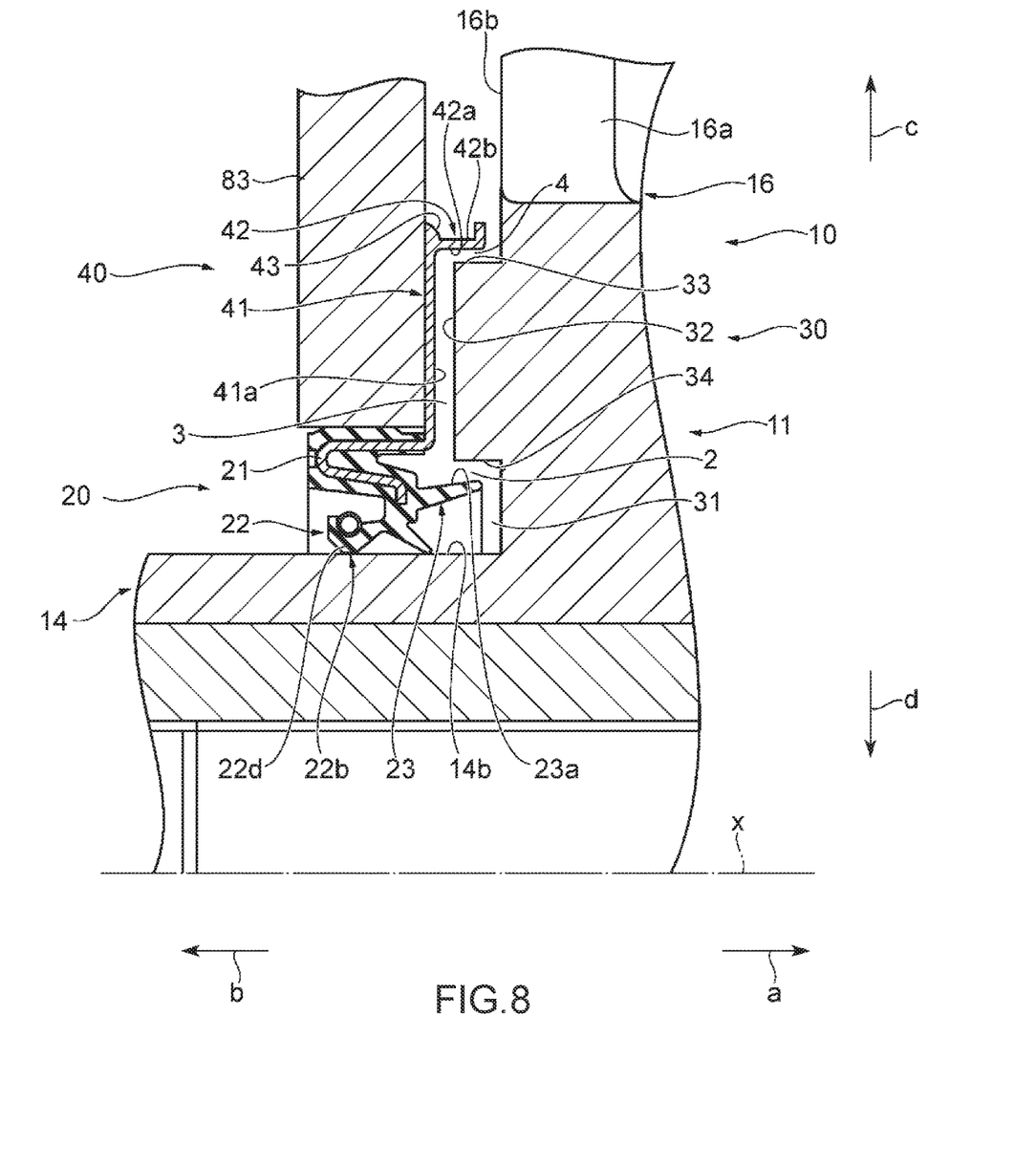
FIG. 8 is a partial enlarged cross-sectional view showing a schematic configuration of a third variation of the sealing structure with a torsional damper and an oil seal shown in FIG. 1.

Next, a third variation of the sealing structure 1 with a torsional damper and an oil seal according to the embodiment of the present disclosure described above will be described. FIG. 8 is a partial enlarged cross-sectional view showing a schematic configuration of the third variation of the sealing structure 1 with a torsional damper and an oil seal according to the embodiment of the present disclosure. The third variation differs in that, in the sealing structure 1 with a torsional damper and an oil seal described above, an annular protrusion protruding toward the outer periphery side is provided to the flange cylindrical part 42 of the flange 40. In the following, the difference will be described, and the components that are the same as or similar to those of the sealing structure 1 with a torsional damper and an oil seal described above will be denoted by the same reference numerals and will not be further described.

Figure 9A:
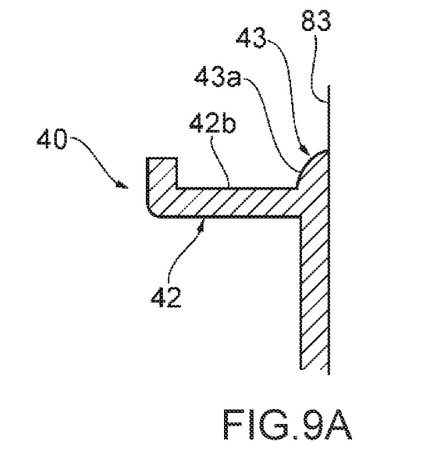
FIGS. 9A to 9D are partial enlarged views of a flange shown in FIG. 8 each showing a variation of the flange.

As shown in FIG. 8, the flange 40 of the oil seal 20 includes an annular protrusion 43 projecting toward the outer periphery side at the inner side end in the outer peripheral surface 42b of the flange cylindrical part 42. The protrusion 43 on the inner side abuts against the front cover 83. The protrusion 43 has an inclined surface 43a on the outer side, and the inclined surface 43a is inclined toward the outer peripheral surface 42b, and is a protruded curved surface toward the outer side in cross section as shown in FIGS. 8 and 9A.

Figure 9B:
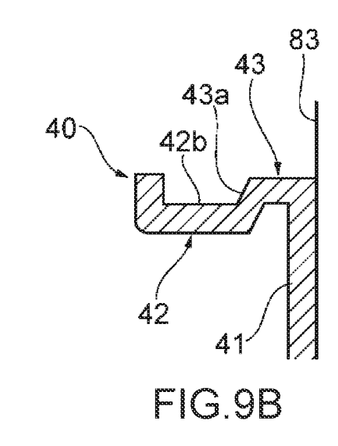
Figure 9C:
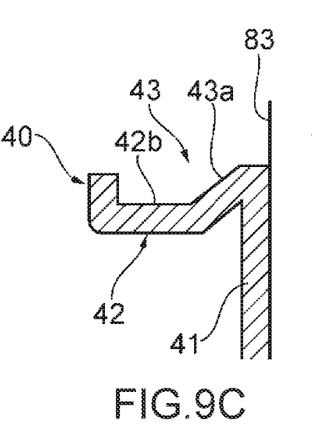
Figure 9D:
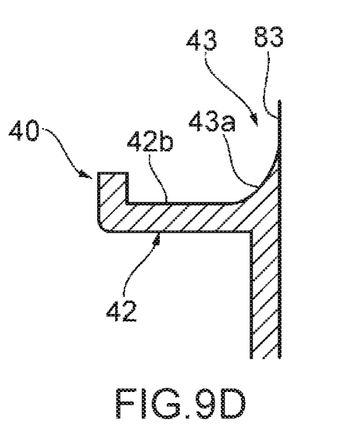

The protrusion 43 formed in the flange cylindrical part 42 can have any shape, as long as the inner side of the protrusion 43 abuts against the front cover 83 and the protrusion 43 has the inclined surface 43a inclined at the outer side, for example, may have shapes shown in FIGS. 9B to 9D. Specifically, the protrusion 43 may be formed by bending the flange 40 at the flange cylindrical part 42 as shown in FIGS. 9B and 9C, and may have the linear inclined surface 43a in cross section. In the protrusion 43 shown in FIG. 9B, the inclined surface 43a is formed separated from the flange disk part 41. In the protrusion 43 shown in FIG. 9C, the inclined surface 43a is formed by directly connecting to the flange disk part 41. In the protrusion 43 shown in FIG. 9D, the inclined surface 43a may have a recessed curved surface toward the inner side.

As described above, the inner side of the protrusion 43 formed in the flange cylindrical part 42 of the flange 40 abuts against the front cover 83, and the protrusion 43 has an inclined surface 43a inclined toward the outer peripheral surface 42b at the outer side. In the abutment portion of the flange cylindrical part 42 between the flange 40 and the front cover 83, the muddy water or the like moves along the inclined surface 43a so that it becomes difficult to remain in the abutment portion. Thus, the protrusion 43 can suppress entry of muddy water or the like into the gap between the flange 40 and the front cover 83, thereby suppress the corrosion of the flange 40 and the front cover 83 to improve the corrosion resistance.

Thus, the third variation of the sealing structure 1 with a torsional damper and an oil seal can achieve the effects of the protrusion 43 in addition to the effects of the sealing structure 1 with a torsional damper and an oil seal according to the first embodiment of the present disclosure.

Although embodiments of the present disclosure have been described above, the present disclosure is not limited to the embodiments described above and includes any aspects without departing from the spirit of the present disclosure and the scope of the claims. Furthermore, the configurations can be selectively combined as required in order to solve at least a part of the problems described above or achieve at least a part of the effects described above. For example, the shape, the material, the location, the size or the like of each component in embodiments described above can be changed as required depending on the specific application of the present disclosure.

For example, the shapes of the projection 30 of the damper pulley 10 and the flange 40 of the oil seal 20 are not limited to the above specific shapes, and the present disclosure includes the shape with the gaps between the projection and the flange formed by covering the projection by the flange part.

Although the sealing structure 1 with a torsional damper and an oil seal according to the present embodiments have been described as being used for an engine of an automobile, the application of the sealing structure with a torsional damper and an oil seal according to the present disclosure is not limited thereto, and the present disclosure can be applied to any structure, such as a rotary shaft of another vehicle, a general-purpose machine, or an industrial machine, that can take advantage of the effects achieved by the present disclosure.

Furthermore, the torsional damper according to these embodiments has been described as having the windows 16a that are through-holes penetrating the disk part 16 between the inner side and the outer side thereof, the application of the sealing structure 1 with a torsional damper and an oil seal according to the present disclosure is not limited thereto, and the present disclosure can be applied to a torsional damper having no windows 16a.

What is claimed is:

1. A sealing structure comprising:
a torsional damper and an oil seal, wherein
the torsional damper includes a hub, an annular mass body centered about an axis that covers an outer circumference of the hub, and a damper elastic body that is disposed between the hub and the mass body and elastically connects the hub and the mass body to each other, the torsional damper being attached to one end of a rotary shaft with the hub being inserted into a through-hole of an attachment target structure,
the oil seal includes an annular seal lip centered about the axis, an annular side lip centered about the axis, and a metal reinforcing ring that is integrally formed with a metal annular flange and that is centered about the axis, the oil seal being attached in the through-hole of the attachment target structure to seal between the hub and the through-hole of the attachment target structure,
the hub includes an annular boss centered about the axis, an annular rim centered about the axis that is located at an outer periphery of the boss, and a disk-shaped disk centered about the axis that connects the boss and the rim to each other,
the disk is provided with an annular projection that protrudes on a side of the disk that is toward the attachment target structure,
the projection and the hub are integrally formed and made of a same metal material, and the projection has an inner side surface, an outer peripheral surface, and an inner peripheral surface,
the seal lip of the oil seal abuts against the boss in a slidable manner, the side lip of the oil seal extends to an inside of an annular groove formed between the projection and the boss in the disk and an outer peripheral surface of the side lip of the oil seal is opposed to the inner peripheral surface of the projection so that a first annular gap in a radial direction that is perpendicular to the axis is formed between the outer peripheral surface of the side lip and the inner peripheral surface of the projection, and the flange of the oil seal covers the projection so that a second annular gap in the radial direction is formed between the flange and the outer peripheral surface the projection, and a flange disk of the flange projects outward in the radial direction from an outer end of the reinforcing ring in an axial direction that is along the axis so that a third annular gap in the axial direction is formed between the flange disk and the inner side surface of the projection, the flange disk having a radial length that directly contacts the attachment target structure, and
the flange and the side lip overlap with the projection in the radial direction.

2. The sealing structure according to claim 1, wherein a water and oil repellent agent is applied on an outer periphery side part of the flange.

3. The sealing structure according to claim 1, wherein the projection includes a discharge surface, the discharge surface having a plurality of grooves that extend toward an outer periphery side and form a flow of a fluid toward the outer periphery side along with rotation of the torsional damper about the axis.

4. The sealing structure according to claim 1, wherein the flange, at an outer periphery side part of the flange includes an annular protrusion that protrudes toward an outer periphery side, and the protrusion abuts against the attachment target structure.

5. The sealing structure according to claim 1, wherein the disk includes a window that passes through the disk, and the projection protrudes from a part of the disk that is between the window and the boss.

6. The sealing structure according to claim 1, wherein the flange disk of the flange is perpendicular to a surface of the oil seal that abuts against an inner periphery side surface of the through-hole.

7. The sealing structure according to claim 1, wherein the oil seal includes a garter spring that presses the seal lip against an outer peripheral surface of the boss, and the garter spring is disposed between the seal lip and the reinforcing ring in the radial direction.

8. The sealing structure according to claim 1, wherein the reinforcing ring includes a U-shaped structure, wherein an opening of the U-shaped structure opens toward the torsional damper in the axial direction.

9. The sealing structure according to claim 1, wherein the flange, at an outer periphery side part of the flange includes a flange cylindrical protrusion that is perpendicular to the flange disk of the flange and protrudes toward an outer periphery side in the axial direction.

10. The sealing structure according to claim 9, wherein the flange cylindrical protrusion of the flange overlaps with the rim of the hub in the radial direction.

11. The sealing structure according to claim 9, wherein the disk of the hub includes a window that passes through the disk, and the flange cylindrical protrusion of the flange is disposed between an inner side of the window and the outer peripheral surface of the projection in a radial direction.

12. The sealing structure according to claim 9, wherein the side lip covers an entire expanse across the third annular gap in the axial direction between the flange disk and the inner side surface of the projection at an inner peripheral side of the third annular gap, and the flange cylindrical protrusion of the flange covers the entire expanse across the third annular gap in the axial direction between the flange disk and the inner side surface of the projection at an outer peripheral side of the third annular gap.

13. The sealing structure according to claim 1, wherein the oil seal includes a dust lip projecting from the oil seal between the seal lip and the side lip, the dust lip abutting against an outer peripheral surface of the boss.

14. The sealing structure according to claim 13, wherein the flange disk of the flange overlaps with the side lip and the dust lip in the radial direction.

15. The sealing structure according to claim 1, wherein the projection includes a rectangular cross section defined by the inner side surface, the outer peripheral surface, and the inner peripheral surface.

16. The sealing structure according to claim 1, wherein the reinforcing ring is embedded inside an elastic body of the oil seal.

17. The sealing structure according to claim 1, wherein the flange disk of the flange and the inner side surface of the projection extend parallel to each other.

18. The sealing structure according to claim 4, wherein the annular protrusion includes a convex curved outer surface.

19. The sealing structure according to claim 4, wherein the annular protrusion includes a linearly inclined outer surface.

20. The sealing structure according to claim 4, wherein the annular protrusion includes a concave curved outer surface.

* * * * *